Patented Apr. 4, 1950

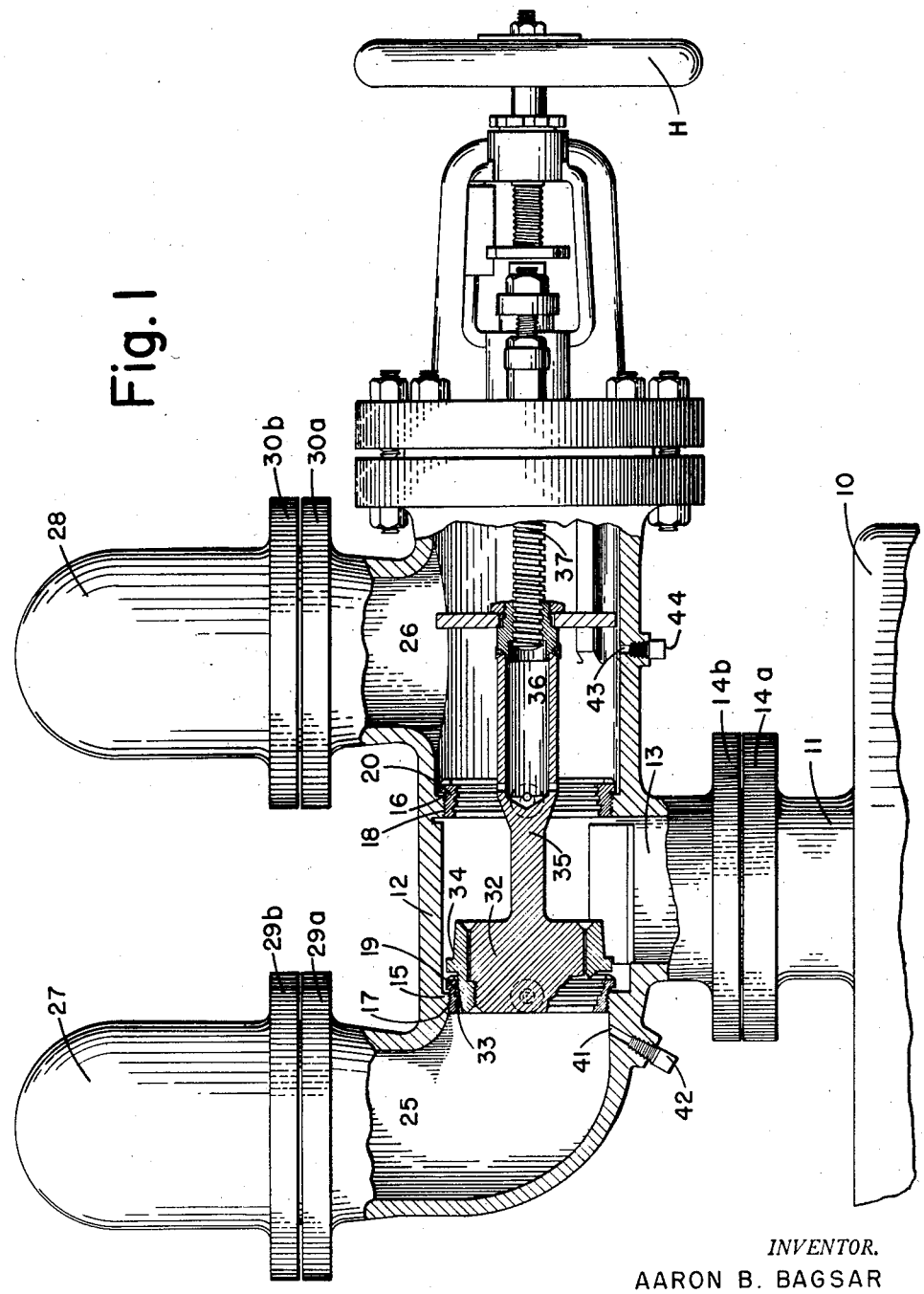

2,503,187

UNITED STATES PATENT OFFICE 2,503,187

PRESSURE RELIEF VALVE SYSTEM

Aaron B. Bagsar, Drexel Hill, Pa., assignor to Sun Oil Company, Philadelphia, Pa., a corporation of New Jersey Application March 24, 1947, Serial No. 736,734

1 Claim. (Cl. 277—51)

In order to safeguard the operation of pressure vessels and pressure containing systems in general, it has been recognized to be necessary to install in pressure systems safety or pressure relief valves. The object of such valve installations is to provide means for automatically relieving the pressure of the system in case the pressure does increase by any cause beyond the safe pressure limit of the vessels, equipment and piping contained in the pressure system. Otherwise failure would result by rupture of the vessels, equipment or piping in the system, with resultant loss of life and other serious damage. In order to assure that at least one safety or pressure relief valve will be available in proper working order at the time that it is needed to relieve the pressure, it is necessary to install at least two pressure relief valves on the pressure system. However, it has been found that these pressure relief valves installed in service often get out of adjustment by various causes, and they also become internally plugged and cannot open because of scale deposition, etc.

As a specific example it can be cited that it is the customary practice in the petroleum industry to store large quantities of volatile fluids under pressure, such as propane, butane and similar hydrocarbons in large vessels and spheroid tanks, which are constructed to withstand predetermined pressures. These vessels usually are located adjacent refineries and the larger refineries require hundreds to store the various fluids. The expense involved in constructing each is great and it is necessary to provide means to prevent any damage thereto as by explosion as well as to protect life and property within the vicinity. The common practice is to install at least two pressure relief valves on each spheroid and from time to time to test each so as to insure that at least one is in proper operating condition and a crew of men are employed to periodically do the inspecting and testing. The manner of testing these pressure relief valves is to close off communication between a spheroid and one of the pressure valves by another valve placed between the vessel and relief valve and to place the vessel in communication with the other relief valve by another independently operated valve then to remove the relief valve not in communication with the pressure vessel and test it, for example in the shop. After the first valve is tested it is reinstalled and placed in communication with the vessel and the other one is tested then or later. This arrangement and testing procedure is subject to human error for if an operator fails to insure that at least one of the pressure relief valves is in communication with the pressure vessel, the vessel then becomes subject to being damaged by pressure which may build up therein, for example when liquid is being supplied thereto.

The present invention provides means by which these pressure relief valves can be periodically tested and if necessary repaired and reconditioned in situ without impairing in any way the pressure relief system and the safety of operation.

The main object of this invention is to provide an arrangement of valves which will insure that a pressure vessel is always in communication with a pressure relief valve.

Another main object of the invention is to provide a pressure relief valve system utilizing a plurality of such valves and wherein means is provided to permit testing of each relief valve.

Other objects of the invention will be apparent from the following disclosure and description.

In the drawings, Figure 1 is partially a diagrammatical view with other parts in section to show details.

In the drawings, 10 indicates a portion of a pressure vessel, for example a spheroid, which is provided with a neck portion 11 and a manifold 12, which is provided with a neck portion 13. Flanges 14a and 14b are provided on the neck portions for readily securing the pressure vessel and manifold together. Within the manifold 12, rings 15 and 16 are positioned in spaced relation and secured to the manifold by screw threads as at 17 and 18. The rings 15 and 16 form valve seats for valve members which are later to be described. The manifold is also provided with two other neck portions 25 and 26 to receive pressure relief valves which are shown diagrammatically. The neck portion 25 is secured to the pressure relief valve by flanges 29a and 29b while the neck portion 26 is secured to the pressure relief valve 28 through flanges 30a and 30b, respectively.

A valve is positioned for reciprocation within the manifold 12 and comprises a plug 32 having a pair of tapered valve ends 33 and 34 which are adapted to cooperate with tapered valve seats 19 and 20, respectively. The plug 32 is made reciprocable by a stem 35 having a hollow bore 36 therein to receive a screw 37 which is actuated by a hand-wheel H. The details of the valve stem assembly and valve seats are disclosed and claimed in my co-pending applications Serial No. 541,171, now Patent Number 2,417,901, granted March 25, 1947, and Serial No. 678,566.

A vent or port 41 having a screw threaded plug 42 is provided in the manifold 12 between the valve seat 12 and outlet 25 while a similar port 43 having a screw threaded plug secured therein indicated at 44 is provided in the manifold 12 between valve seat 20 and outlet 26.

In operation, and assuming that the elements are in the position as shown in the drawings, fluid communication is provided between the pressure vessel 10 and relief valve 28 by means of the outlet 11 of the pressure vessel inlet 13 of the manifold 12 and outlet 26 of the manifold to pressure relief valve 28. When the parts are so arranged, an operator may remove plug 42 and attach a suitable coupling to the port 41 to supply a predetermined amount of pressure into the manifold 12, through the outlet 25 and then to pressure relief valve 27 and thereby ascertain in situ whether the pressure relief valve is performing properly. As the plug 32 is in sealing engagement with valve seat 19, the pressure supplied through port 41 and pressure relief valve 27 cannot back into the pressure vessel 10, which would otherwise give a false test of pressure relief valve 27. During this testing operation of pressure relief valve 27, pressure vessel 10 is in fluid communication with pressure relief valve 28. After the pressure relief valve 27 has been tested, the same may be repaired or replaced if found defective without interfering with the function of the system. Assuming now that pressure relief valve 27 has been found to be in proper order, or repaired and placed in proper operating condition, plug 42 is inserted in port 41, and screw 37 is rotated to reciprocate plug 32 into sealing engagement with valve seat 20, thus closing off fluid communication between the pressure vessel 10 to pressure relief valve 28 while simultaneously effecting fluid communication between the pressure vessel 10 through its opening 11, inlet 13 of manifold 12, and then through outlet 25 to pressure relief valve 27. Thereafter, a predetermined pressure may be similarly supplied to the manifold 12 through port 43 and outlet 26 to pressure relief valve 28 and thereby test the functioning of the relief valve 28. Here again, the pressure supplied to the manifold 12 cannot enter the pressure vessel 10. While either of the pressure relief valves is being tested, the function of the other relief valve is in no way impaired, as one is always in fluid communication with the pressure vessel.

Also, it will be noted that after the pressure relief valves have been tested, the function of the system cannot be impaired regardless of the position the valve plug 32 may have within the manifold. If the plug 32 is not seated in either valve seat 19 or 20 but is in some position therebetween, both valves will be partly open and in which case the system will function as properly as when one is closed and one is open. It will be appreciated then that the invention provides a method of testing the pressure relief valves safely, in situ and permits making necessary repairs or adjustments to the pressure relief valves, without impairing the safety of the system.

What I claim and desire to protect by Letters Patent is:

In a pressure relief valve system comprising, in combination, a pressure vessel having an outlet for the passage of fluid therefrom, a manifold having an inlet in communication with said vessel outlet, a pair of outlets for said manifold, a pressure relief valve for each of said manifold outlets, a pair of opposed valve seats within said manifold, one of said valve seats being positioned between said manifold inlet and one of said manifold outlets and the other valve seat being positioned between said manifold inlet and the other manifold outlet, a valve plug within said manifold adapted for reciprocation to cooperate with said seats in alternation to effect a fluid seal between the manifold inlet and either of said manifold outlets while providing fluid communication between the manifold inlet and the other manifold outlet, the improvement which includes a pair of openings in said manifold, each of said openings being positioned between a valve seat and the pressure relief valve adjacent thereto, said openings being normally closed but each being adapted to receive means for supplying pressure to said relief valves to thereby enable said pressure relief valves to be tested independently of each other and without interfering with the function of the system.

AARON B. BAGSAR.

REFERENCES CITED

The following references are of record in the file of this patent:

UNITED STATES PATENTS

| Number | Name | Date |
|---|---|---|
| 663,593 | Wilson | Dec. 11, 1900 |
| 1,253,344 | Braun | Jan. 15, 1918 |

FOREIGN PATENTS

| Number | Country | Date |
|---|---|---|
| 299,548 | Great Britain | Apr. 10, 1928 |